(12) United States Patent
Marker et al.

(10) Patent No.: US 8,314,274 B2
(45) Date of Patent: *Nov. 20, 2012

(54) CONTROLLING COLD FLOW PROPERTIES OF TRANSPORTATION FUELS FROM RENEWABLE FEEDSTOCKS

(75) Inventors: Terry L. Marker, Palos Heights, IL (US); Charles P. Luebke, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/556,871

(22) Filed: Sep. 10, 2009

(65) Prior Publication Data

US 2011/0105812 A1    May 5, 2011

Related U.S. Application Data

(60) Provisional application No. 61/138,147, filed on Dec. 17, 2008.

(51) Int. Cl.
*C10L 1/08* (2006.01)
*C07C 1/00* (2006.01)

(52) U.S. Cl. ............. 585/240; 585/14; 585/733; 44/605

(58) Field of Classification Search .................. 585/240
See application file for complete search history.

(56) References Cited

U.S. PATENT DOCUMENTS

| | | | |
|---|---|---|---|
| 5,186,722 A | 2/1993 | Cantrell et al. | |
| 5,705,722 A | 1/1998 | Monnier et al. | |
| 6,103,101 A | 8/2000 | Fragelli et al. | |
| 7,232,935 B2 | 6/2007 | Jakkula et al. | |
| 7,279,018 B2 | 10/2007 | Jakkula et al. | |
| 7,425,657 B1 | 9/2008 | Elliott et al. | |
| 7,459,597 B2 | 12/2008 | Koivusalmi et al. | |
| 7,491,858 B2 | 2/2009 | Murzin et al. | |
| 7,501,546 B2 | 3/2009 | Koivusalmi et al. | |
| 7,540,952 B2 | 6/2009 | Pinho et al. | |
| 7,578,927 B2 * | 8/2009 | Marker et al. | 208/67 |
| 7,816,570 B2 * | 10/2010 | Roberts et al. | 585/240 |
| 7,883,882 B2 * | 2/2011 | Franklin et al. | 435/196 |
| 7,915,460 B2 * | 3/2011 | Kalnes et al. | 585/240 |
| 7,982,076 B2 * | 7/2011 | Marker et al. | 585/240 |
| 7,982,078 B2 * | 7/2011 | Brady et al. | 585/240 |
| 7,982,079 B2 * | 7/2011 | Marker et al. | 585/240 |
| 8,003,836 B2 * | 8/2011 | Marker et al. | 585/240 |
| 8,058,492 B2 * | 11/2011 | Anumakonda et al. | 585/14 |
| 2003/0150777 A1 | 8/2003 | Johnson et al. | |
| 2005/0077867 A1 | 4/2005 | Cawthorne et al. | |
| 2005/0158637 A1 | 7/2005 | Kim et al. | |

(Continued)

FOREIGN PATENT DOCUMENTS

CN      11270300 A    9/2008

(Continued)

*Primary Examiner* — Ellen McAvoy
(74) *Attorney, Agent, or Firm* — Maryann Maas

(57) ABSTRACT

A process for improving cold flow properties of diesel range hydrocarbons produced from renewable feedstocks such as plant oils and animal oils. A renewable feedstock is treated by hydrogenating and deoxygenating to provide an effluent comprising paraffins followed by isomerizing and selectively hydrocracking at least a portion of the paraffins to generate a diesel range hydrocarbon product. A portion of the diesel range hydrocarbon product is selectively separated and recycled to the isomerization and selective hydrocracking zone.

20 Claims, 2 Drawing Sheets

U.S. PATENT DOCUMENTS

| | | | |
|---|---|---|---|
| 2005/0287029 | A1 | 12/2005 | Chung et al. |
| 2006/0186020 | A1 | 8/2006 | Gomes |
| 2006/0207166 | A1 | 9/2006 | Herskowitz et al. |
| 2007/0006523 | A1 | 1/2007 | Myllyoja et al. |
| 2007/0010682 | A1 | 1/2007 | Myllyoja et al. |
| 2007/0068848 | A1 | 3/2007 | Monnier et al. |
| 2007/0131579 | A1 | 6/2007 | Koivusalmi et al. |
| 2007/0135316 | A1 | 6/2007 | Koivusalmi et al. |
| 2007/0135663 | A1 | 6/2007 | Aalto et al. |
| 2007/0161832 | A1 | 7/2007 | Myllyoja et al. |
| 2007/0170091 | A1 | 7/2007 | Monnier et al. |
| 2007/0175795 | A1 | 8/2007 | Yao et al. |
| 2007/0260102 | A1 | 11/2007 | Duarte Santiago et al. |
| 2007/0281875 | A1 | 12/2007 | Scheibel et al. |
| 2007/0287873 | A1 | 12/2007 | Coupard et al. |
| 2007/0299291 | A1 | 12/2007 | Koivusalmi |
| 2008/0025903 | A1 | 1/2008 | Cortright |
| 2008/0033188 | A1 | 2/2008 | Dumesic et al. |
| 2008/0045731 | A1 | 2/2008 | Zhang |
| 2008/0050792 | A1 | 2/2008 | Zmierczak et al. |
| 2008/0052983 | A1 | 3/2008 | Aulich et al. |
| 2008/0066374 | A1 | 3/2008 | Herskowitz |
| 2008/0092436 | A1 | 4/2008 | Seames et al. |
| 2008/0132435 | A1 | 6/2008 | Ferreira Fontes et al. |
| 2008/0156694 | A1 | 7/2008 | Chapus et al. |
| 2008/0161614 | A1 | 7/2008 | Bertoncini et al. |
| 2008/0161615 | A1 | 7/2008 | Chapus et al. |
| 2008/0163543 | A1 | 7/2008 | Abhari et al. |
| 2008/0173570 | A1 | 7/2008 | Marchand et al. |
| 2008/0216391 | A1 | 9/2008 | Cortright et al. |
| 2008/0229654 | A1 | 9/2008 | Bradin |
| 2008/0244962 | A1 | 10/2008 | Abhari et al. |
| 2008/0281134 | A1 | 11/2008 | Ghonasgi et al. |
| 2008/0300434 | A1 | 12/2008 | Cortright et al. |
| 2008/0300435 | A1 | 12/2008 | Cortright et al. |
| 2008/0302001 | A1 | 12/2008 | Koivusalmi et al. |
| 2008/0308457 | A1 | 12/2008 | Dindi et al. |
| 2008/0308458 | A1 | 12/2008 | Dindi et al. |
| 2008/0312480 | A1 | 12/2008 | Dindi et al. |
| 2008/0313955 | A1 | 12/2008 | Silva et al. |
| 2009/0014354 | A1 | 1/2009 | Knuuttila et al. |
| 2009/0019763 | A1 | 1/2009 | Ghonasgi et al. |
| 2009/0029427 | A1 | 1/2009 | Miller |
| 2009/0031617 | A1 | 2/2009 | O'Rear |
| 2009/0062578 | A1 | 3/2009 | Koivusalmi et al. |
| 2009/0069610 | A1 | 3/2009 | Roberts, IV et al. |
| 2009/0071872 | A1 | 3/2009 | Ginosar et al. |
| 2009/0077864 | A1 | 3/2009 | Marker et al. |
| 2009/0077865 | A1 | 3/2009 | Kalnes et al. |
| 2009/0077866 | A1 | 3/2009 | Kalnes et al. |
| 2009/0077868 | A1 | 3/2009 | Brady et al. |
| 2009/0078611 | A1 | 3/2009 | Marker et al. |
| 2009/0082603 | A1 | 3/2009 | Kalnes et al. |
| 2009/0082606 | A1* | 3/2009 | Marker et al. ............... 585/733 |
| 2009/0084026 | A1 | 4/2009 | Miller |
| 2009/0088351 | A1 | 4/2009 | Miller |
| 2009/0107033 | A1 | 4/2009 | Gudde et al. |
| 2009/0124839 | A1 | 5/2009 | Dumesic et al. |
| 2009/0126260 | A1 | 5/2009 | Aravanis et al. |
| 2009/0162264 | A1 | 6/2009 | McCall et al. |
| 2009/0193709 | A1 | 8/2009 | Marker et al. |
| 2009/0229172 | A1 | 9/2009 | Brady et al. |
| 2009/0229173 | A1 | 9/2009 | Gosling |
| 2009/0229174 | A1* | 9/2009 | Brady et al. .................... 44/308 |
| 2009/0283442 | A1 | 11/2009 | McCall et al. |
| 2011/0131867 | A1* | 6/2011 | Kalnes et al. ................... 44/307 |

FOREIGN PATENT DOCUMENTS

| | | | |
|---|---|---|---|
| CN | 11343552 A | | 1/2009 |
| EP | 1719811 A1 | | 8/2006 |
| EP | 2046917 | | 1/2008 |
| WO | WO 2007/064019 A1 | | 6/2007 |
| WO | WO 2007063874 A1 | | 6/2007 |
| WO | WO 2007064015 A1 | | 6/2007 |
| WO | WO 2007/125332 A1 | | 11/2007 |
| WO | WO 2007/141293 A1 | | 12/2007 |
| WO | WO 2008/012415 A2 | | 1/2008 |
| WO | WO 2008/020048 A2 | | 2/2008 |
| WO | WO 2008/053284 A1 | | 5/2008 |
| WO | WO 2008/101945 A1 | | 8/2008 |
| WO | WO 2008/105518 A1 | | 9/2008 |
| WO | WO 2008/119895 A2 | | 9/2008 |
| WO | WO 2008/141830 A1 | | 11/2008 |
| WO | WO 2008/141831 A1 | | 11/2008 |
| WO | WO 2008/151792 A1 | | 12/2008 |
| WO | WO 2008/152199 A1 | | 12/2008 |
| WO | WO 2009/004181 A2 | | 1/2009 |
| WO | WO 2009/011639 A2 | | 1/2009 |
| WO | WO 2009/013233 A2 | | 1/2009 |
| WO | WO 2009/020055 A1 | | 2/2009 |
| WO | WO 2009/025542 A1 | | 2/2009 |
| WO | WO 2009/059819 A1 | | 5/2009 |
| WO | WO 2009/059920 A2 | | 5/2009 |

\* cited by examiner

CONTROLLING COLD FLOW PROPERTIES OF TRANSPORTATION FUELS FROM RENEWABLE FEEDSTOCKS

CROSS-REFERENCE TO RELATED APPLICATION

This application claims priority from Provisional Application Ser. No. 61/138,147 filed Dec. 17, 2008, the contents of which are hereby incorporated by reference in its entirety.

BACKGROUND OF THE INVENTION

This invention relates to a process for controlling the cloud point of transportation fuels including diesel fuel and aviation fuel from renewable feedstocks such as the glycerides and free fatty acids found in materials such as plant oils, fish oils, animal fats, and greases. The process involves hydrogenation, decarboxylation, decarbonylation, and/or hydrodeoxygenation and hydroisomerization in two or more steps. Desired product specifications and yields are determined and recycle streams are set to achieve the specifications and yields.

As the demand for transportation fuel increases worldwide there is increasing interest in sources other than petroleum crude oil for producing diesel and aviation fuel. One such source is what has been termed renewable feedstocks. These renewable feedstocks include examples such as plant oils such as corn, rapeseed, canola, soybean and algal oils, animal fats and oils such as tallow, fish oils and various waste streams such as yellow and brown greases and sewage sludge. The common feature of these feedstocks is that they are composed of glycerides and Free Fatty Acids (FFA). Both of these types of compounds contain aliphatic carbon chains generally having from about 8 to about 24 carbon atoms. The aliphatic carbon chains in the glycerides or FFAs can be saturated or mono-, di- or poly-unsaturated. Most of the glycerides in the renewable fed stocks will be triglycerides, but some of the glycerides in the renewable feedstock may be monoglycerides or diglycerides. The monoglycerides and diglycerides can be processed along with the triglycerides.

There are reports in the art disclosing the production of hydrocarbons from plant oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

The process herein comprises an optional pretreatment step, and one or more steps to hydrogenate, deoxygenate, hydroisomerize and selectively hydrocrack the renewable feedstock, to generate at least a diesel fuel component and optionally, an aviation fuel component. The specifications and relative yields of the diesel component and the aviation component are determined and the amount and type of recycle to the isomerization and selective hydrocracking zone is determined in order to meet the specifications and yields of the products. The diesel component and the aviation component may be suitable as fuels, used as components in blending pools, or may have one or more additives incorporated before being used as fuels.

SUMMARY OF THE INVENTION

The process is for producing diesel boiling point range hydrocarbons from a renewable feedstock. The process comprises hydrogenating and deoxygenating the renewable feedstock by contacting the feedstock in a hydrogenation and deoxygenation zone with a hydrogenation and deoxygenation catalyst at hydrogenation and deoxygenation conditions to provide a hydrogenation and deoxygenation zone effluent comprising at least n-paraffins. The process calls for isomerizing and selectively hydrocracking at least a portion of the n-paraffins in the hydrogenation and deoxygenation zone effluent by contacting with an isomerization and selective hydrocracking catalyst at isomerization and selective cracking conditions in an isomerization and selective hydrocracking zone to generate an isomerization and selective hydrocracking zone effluent comprising at least branched-paraffins. The process involves selectively separating, in a separation zone, at least a portion of the isomerization and selective hydrocracking zone effluent to provide: a diesel product stream comprising a first portion of the paraffins having boiling points in the diesel boiling point range; a recycle stream comprising a second portion of the paraffins having boiling points in the diesel boiling point range wherein the composition of the diesel product stream and the recycle stream are not the same; and at least one overhead stream comprising at least LPG and naphtha. The recycle stream is recycled to the isomerization and selective hydrocracking zone. The separation zone may have a single fractionation column, two or more fractionation columns, or a hot flash drum and at least one fractionation column. The selectively separating step may further provide an aviation product stream comprising paraffins having boiling points in the aviation boiling point range.

DETAILED DESCRIPTION OF THE INVENTION

Figure 1:
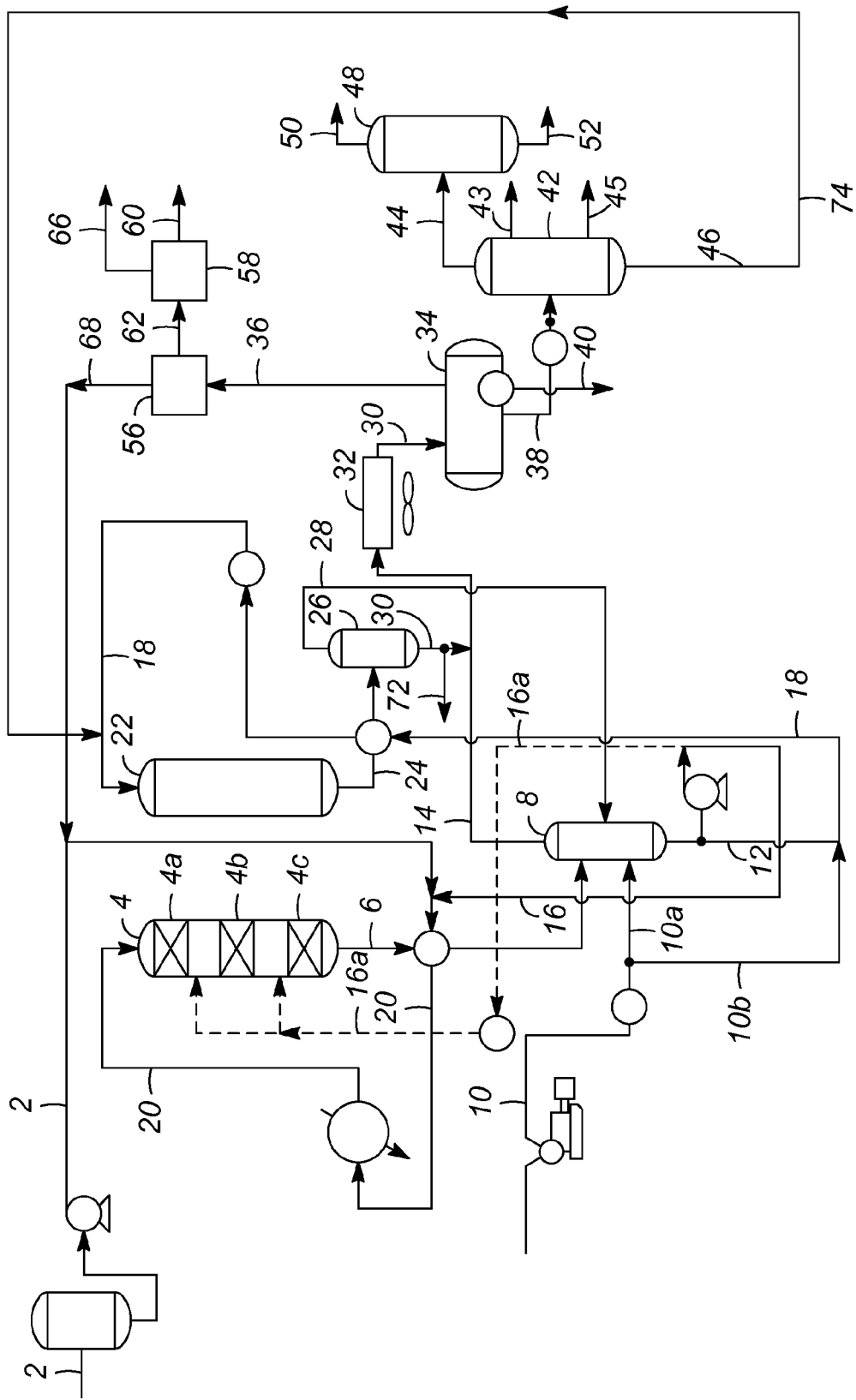
FIG. 1 is a general flow scheme of one embodiment of the invention where the product stripper column is employed to generate the product stream(s) and the paraffinic recycle stream to the isomerization zone.

As stated, the present invention relates to a process for producing at least a first hydrocarbon product stream useful as diesel boiling point range fuel or diesel boiling point range fuel blending component from a renewable feedstock such as those originating from plants or animals wherein the process provides for controlling the cloud point of the produced fuel or fuel blending component. Optionally a second hydrocarbon product stream useful as aviation fuel or an aviation fuel blending component may be produced, and the process may be used to control the freeze point of the aviation fuel. Controlling cloud point or freeze point of the products enables the fuels to meet specifications as provided by industry, government, or military. Different types of diesel fuels or aviation fuels may be produced, and the current process provides a technique to enable an operator to produce different fuel types at different times or different relative yields at different times. For example, should the demand for low cloud point diesel increase, such as with the seasons, the current process allows and operator to adjust the cloud point of the diesel fuel to meet changing demands. Similarly, the freeze point of the jet fuel or aviation fuel may be adjusted as well. Furthermore, should the demand for aviation fuel increase relative to diesel fuel, the current process allows an operator to adjust the relative yields of aviation fuel and diesel fuel to meet changing demands The term renewable feedstock is meant to include feedstocks other than those obtained directly from petroleum crude oil. Another term that has been used to describe at least a portion of this class of feedstocks is biorenewable feedstocks. The renewable feedstocks that can be used in the present invention include any of those which comprise glycerides and free fatty acids (FFA). Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina, oil, jatropha oil, curcas oil, babassu oil, palm kernel oil and the like. The glycerides and FFAs of the typical vegetable or animal fat contain aliphatic hydrocarbon chains in their structure which have about 8 to about 24 carbon atoms with a many of the oils containing high concentrations of fatty acids with 16 and 18 carbon atoms. Mixtures or co-feeds of renewable feedstocks and petroleum derived hydrocarbons may also be used as the feedstock. Other feedstock components which may be used, especially as a co-feed component in combination with the above listed renewable feedstocks, include spent motor oils and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is transformation of what has been considered to be a waste product from a petroleum based process into a valuable co-feed component to the current process.

The principle hydrocarbon product generated by the current process is a diesel fuel or fuel blending component. The diesel component comprises hydrocarbons having a boiling point in the diesel boiling point range and may be used directly as a fuel, may be blended with other components before being used as diesel fuel, or may receive additives before being used as a diesel fuel. In addition, the process may optionally produce an aviation component which comprises hydrocarbons having a boiling point in the aviation boiling point range, which includes the jet range, and may be used directly as aviation fuel or may be used as a blending component to meet the specifications for a specific type of aviation fuel, or may receive additives before being used as an aviation fuel. Depending upon the application, various additives may be combined with the aviation component or the diesel component generated in order to meet required specifications for different specific fuels. In particular, the aviation fuel composition optionally generated herein complies with, is a blending component for, or may be combined with one or more additives to meet key product specifications of at least one of: ASTM D 1655 Specification for Aviation Turbine Fuels Defense Stan 91—91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel may be referred to as "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification MIL-DTL-83133, which is a military grade type of highly refined kerosene based jet propellant specified by the United States Government. The fuel produced from glycerides or FAA as described herein is very similar to isoparaffinic kerosene or iPK, also known as a synthetic jet fuel.

The current process allows for an operator to select a target cloud point for the diesel fuel or blending component to be produced. If aviation fuel or blending component is being produced, a target characteristic such as freeze point may be selected. The relative yields of diesel fuel and aviation fuel may also be controlled in the current process. The process calls for the recycling of a select portion of the diesel fuel to the isomerization and selective cracking zone. The diesel fuel produced is fractionated so that the heavier paraffins, such as those having from 17 carbon atoms and greater, are recycle to the isomerization and selective cracking zone. In the isomerization and selective cracking zone, these longer carbon chain hydrocarbons are selectively cracked into smaller chain paraffins and isomerized to branched paraffins thus increasing the yield of the diesel fuel fraction comprising hydrocarbons having 16 or fewer carbon atoms. This portion of the diesel fuel range has a cloud point of less than 0° C. and can be lower than −15° C., such as −20° C., as determined by ASTM D2500. Some of recycled paraffins may crack to form hydrocarbons in the aviation fuel range thereby influencing the yield of aviation fuel and perhaps the characteristics of the aviation fuel. For example, the aviation fuel produced may have a freeze point of −47° C. or less, as determined by ASTM D2500. By selecting different quantities of the diesel fuel to recycle and by selecting different cuts of the diesel fuel to recycle, different fuels may be produced. The relative yields of the diesel component and the aviation component may be changed as well.

Renewable feedstocks used in the present invention may contain a variety of impurities. For example, tall oil is a by product of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. Another technique includes contacting the renewable feedstock with a bleaching earth, such as bentonite clay, in a pretreatment zone.

Another possible means for removing contaminants is a mild acid wash. This is carried out by contacting the renewable feedstock with an acid such as sulfuric, nitric, phosphoric, or hydrochloric in a reactor. The acid and renewable feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the renewable feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in US 2009/0000985 A1 is another pretreatment technique which may be employed.

The feedstock is flowed to a hydrogenation and deoxygenation zone comprising one or more catalyst beds in one or more reactors. The term feedstock is meant to include feedstocks that have not been treated to remove contaminants as well as those feedstocks purified in a pretreatment zone or oil processing facility. In the hydrogenation and deoxygenation zone, the feedstock is contacted with a hydrogenation or hydrotreating catalyst in the presence of hydrogen at hydrogenation conditions to hydrogenate the olefinic or unsaturated portions of the aliphatic hydrocarbon chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Deoxygenation conditions include a relatively low pressure of about 1724 kPa absolute (250 psia) to about 10,342 kPa absolute (1500 psia), with embodiments in the range of 3447 kPa (500 psia) to about 6895 kPa (1000 psia) or below 700 psia; a temperature of about 200° C. to about 460° C. with embodiments in the range of about 288° C. to about 345° C.; and a liquid hourly space velocity of about 0.25 to about 4 hr$^{-1}$ with embodiments in the range of about 1 to about 4 hr$^{-1}$. Since hydrogenation is an exothermic reaction, as the feedstock flows through the catalyst bed the temperature increases and decarboxylation, decarbonylation, and hydrodeoxygenation will occur. Although the hydrogenation reaction is exothermic, some feedstocks may be highly saturated and not generate enough heat internally. Therefore, some embodiments may require external heat input. Thus, it is envisioned and is within the scope of this invention that all the reactions occur simultaneously in one reactor or in one bed. Alternatively, the conditions can be controlled such that hydrogenation primarily occurs in one bed and decarboxylation, decarbonylation, and/or hydrodeoxygenation occurs in a second or additional bed(s). If only one bed is used, it may be operated so that hydrogenation occurs primarily at the front of the bed, while decarboxylation, decarbonylation and hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor. However, the order of the reactions is not critical to the success of the process.

The reaction product from the hydrogenation and deoxygenation reactions will comprise both a liquid portion and a gaseous portion. The liquid portion comprises a hydrocarbon fraction comprising n-paraffins and having a large concentration of paraffins in the 15 to 18 carbon number range, with a full paraffin range of from about 9 to about 24 carbon atoms. Different feedstocks will have different distributions of paraffins. A portion of this hydrocarbon fraction, after separation from the gaseous portion, may be used as the hydrocarbon recycle to the hydrogenation and deoxygenation zone described above. Although this hydrocarbon fraction is in a carbon number range that is useful as a diesel fuel or diesel fuel blending component, because the hydrocarbon fraction comprises essentially all n-paraffins, it will have poor cold flow properties. Many diesel and aviation fuels and blending components must have better cold flow properties and so the reaction product is further reacted under isomerization conditions to isomerize at least a portion of the n-paraffins to branched paraffins thereby improving the cold flow properties. Also, additional fuels, such as aviation fuels or aviation fuel blending components which typically have a concentration of paraffins in the range of about 9 to about 16 carbon atoms, may be produced in the current process with additional processing.

The gaseous portion of the reaction product from the hydrogenation and deoxygenation zone comprises hydrogen, carbon dioxide, carbon monoxide, water vapor, propane and perhaps sulfur components such as hydrogen sulfide or phosphorous component such as phosphine. The effluent from the deoxygenation zone is conducted to a hot high pressure hydrogen stripper. One purpose of the hot high pressure hydrogen stripper is to selectively separate at least a portion of the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The hydrogen used for the stripping may be dry, and free of carbon oxides. The temperature may be controlled in a limited range to achieve the desired separation and the pressure may be maintained at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the reaction zone. By "essentially", it is meant that the operating pressure of the hot high pressure hydrogen stripper is within about 1034 kPa absolute (150 psia) of the operating pressure of the reaction zone. For example, in one embodiment the hot high pressure hydrogen stripper separation zone is no more than 1034 kPa absolute (150 psia) less than that of the reaction zone.

The effluent enters the hot high pressure stripper and at least a portion of the gaseous components, are carried with the hydrogen stripping gas and separated into an overhead stream. The remainder of the deoxygenation zone effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below.

Hydrogen is a reactant in the reactions above, and to be effective, a sufficient quantity of hydrogen must be in solution to most effectively take part in the catalytic reaction. Past processes have operated at high pressures in order to achieve a desired amount of hydrogen in solution and readily available for reaction. If hydrogen is not available at the reaction site of the catalyst, the coke forms on the catalyst and deactivates the catalyst. To solve this problem, the pressure is often raised to insure enough hydrogen is available to avoid coking reactions on the catalyst. However, higher pressure operations are more costly to build and to operate as compared to their lower pressure counterparts. The present invention allows for the operating pressure to be in the range of about 1379 kPa absolute (200 psia) to about 4826 kPa absolute (700 psia) which is lower than that found in many previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In one embodiment of the invention, the desired amount of hydrogen is kept in solution at lower pressures by employing a large recycle of hydrocarbon. Other processes have employed hydrocarbon recycle in order to control the temperature in the reaction zones since the reactions are exothermic reactions. However, the range of recycle to feedstock ratios used herein is set based on the need to control the level of hydrogen in the liquid phase and therefore reduce the deactivation rate. The amount of recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1. The ranges of suitable volume ratios of hydrocarbon recycle to feedstock are described in US 2009/0082606 A1. Suitable ranges for hydrogen solubility were shown to begin at about a recycle to feed ratio of about 2:1. From recycle to feed ratios of about 2:1 through 6:1 the simulation of US 2009/0082606 A1 showed that the hydrogen solubility remained high. Thus, the specific ranges of vol/vol ratios of recycle to feed for this embodiment is determined based on achieving a suitable hydrogen solubility in the deoxygenation reaction zone.

In another embodiment, instead of recycling hydrocarbon, one or more of the co-feed components discussed above may be used to provide the solubility of hydrogen and temperature control. Depending upon the relative costs of the hydrocarbon and the co-feed component, one embodiment may be more economic than the other. It is important to note that the recycle or co-feed is optional and the process does not require recycle or co-feed. Complete deoxygenation and hydrogenation may be achieved without recycle or co-feed components. In still another embodiment, the process may be conducted with continuous catalyst regeneration in order to counteract the catalyst deactivation effects of the lower amounts of hydrogen in solution or the higher operating conditions.

As mentioned above, although the hydrocarbons may be useful as a diesel fuel, or a diesel fuel blending component, because they comprises essentially all n-paraffins, they will have poor cold flow properties. To improve the cold flow properties of the liquid hydrocarbon fraction, the liquid phase of the reaction product is contacted with an isomerization catalyst under isomerization conditions in an isomerization and selective hydrocracking zone to at least partially isomerize the normal paraffins to branched paraffins.

Catalysts and conditions for isomerization are well known in the art. See for example US 2004/0230085 A1 which is incorporated by reference in its entirety. The conditions used for the isomerization are predetermined so that the proper degree of isomerization and selective cracking are achieved to meet the predetermined specifications of the desired products. Isomerization can be carried out in a separate bed of the same reaction zone, i.e. same reactor, described above or the isomerization can be carried out in a separate reactor. The product of the deoxygenation reaction zone is contacted with an isomerization catalyst in the presence of hydrogen at isomerization conditions to isomerize the normal paraffins to branched paraffins. In some embodiments, only minimal branching is required, enough to overcome cold-flow problems of the normal paraffins. In other embodiments, a greater amount of isomerization is desired. The predominate isomerization product is generally a mono-branched hydrocarbon. Along with the isomerization, some selective hydrocracking of the hydrocarbons will occur. The more severe the conditions of the isomerization zone, the greater the amount of hydrocracking of the hydrocarbons. The hydrocracking occurring in the isomerization zone results in a wider distribution of hydrocarbons than resulted from the deoxygenation zone and increased levels of hydrocracking produces higher yields of hydrocarbons in the aviation fuel boiling range.

The isomerization of the paraffinic hydrocarbons can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal Me is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and 5,851,949 are hereby incorporated by reference.

U.S. Pat. Nos. 5,444,032 and 5,608,134 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,968,344 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization catalyst may be any of those well known in the art such as those described and cited above. In general, isomerization conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization zone are well known in the art, and the specific operating conditions used are predetermined and are dependant upon the desired product specifications and relative yields of the products.

The catalysts suitable for the isomerization of the paraffinic hydrocarbons and the conditions of the isomerization zone also operate to cause some hydrocracking of the hydrocarbons. Therefore, although a main product of the hydrogenation, deoxygenation, and isomerization steps is a paraffinic hydrocarbon fraction suitable for use as diesel fuel or as a blending component for diesel fuel, a second paraffinic hydrocarbon suitable for use as an aviation fuel, or as a component for aviation fuel may optionally be generated as well. As illustrative of this concept, a concentration of paraffins formed from renewable feedstocks typically has about 15 to 18 carbon atoms, but additional paraffins may be formed to provide a broader range of from about 8 to about 24 carbon atoms. A portion of the normal paraffins are isomerized to branched paraffins, but the carbon number range of paraffins does not alter with isomerization alone. However, some hydrocracking may occur concurrently with the isomerization, generating paraffins having boiling points from about 150° C. to about 300° C. which is lower than that of the majority of C15 to C18 paraffins produced in the deoxygenation reaction zone. The about 150° C. to about 300° C. boiling point range meets many aviation fuel specifications and may be separated from the other boiling point ranges after the isomerization zone in order to produce an aviation fuel. This will lower the overall yield of diesel fuel but allows for the optional production of two fuel products: a diesel fuel and an aviation fuel. The process severity in the isomerization zone is one factor in controlling the potential yield of product for aviation fuel, the amount of light products that are not useful for diesel fuel or aviation fuel, and the isomerized/normal ratio of both aviation and diesel range fuel. The hydrocracking is controlled through catalyst choice and reaction conditions in an attempt to restrict the degree of hydrocracking occurring. Ideally, each paraffin molecule would experience only a single hydrocracking event and ideally that single hydrocracking event would result in at least one paraffin in the C9 to C15 carbon number range. Careful choice of catalyst and control of the process conditions in the isomerization zone both maximizes paraffin products in the desired fuel range while minimizing the production of the light paraffins that are not useful for either diesel fuel or aviation fuel applications.

Fuel specifications are typically not based upon carbon number ranges. Instead, the specifications for different types of fuels are often expressed through acceptable ranges of chemical and physical requirements of the fuel. For example, aviation turbine fuels, a kerosene type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the optional aviation fuel product of the present invention will meet key aviation fuel specifications, it is expected that some blending of the product with other blending components may be required to meet the desired set of fuel specifications. In other words, one product of this invention is a composition which may be used with other components to form a fuel meeting at least one of the specifications for aviation fuel such as JP-8. The desired aviation fuel product is a highly paraffinic distillate fuel component having a paraffin content of at least 75% by volume.

The catalysts of the subject process can be formulated using industry standard techniques. It is may be manufactured in the form of a cylindrical extrudate having a diameter of from about 0.8 to about 3.2 mm (1/32 in to about 1/8 in). The catalyst can be made in any other desired form such as a sphere or pellet. The extrudate may be in forms other than a cylinder such as the form of a well-known trilobe or other shape which has advantages in terms or reduced diffusional distance or pressure drop.

The stream obtained after all reactions have been carried out, the final effluent stream, is now processed through one or more separation steps to obtain at least one purified hydrocarbon product stream and one recycle stream. The purified hydrocarbon product stream is useful as a diesel fuel or diesel fuel blending component and an optional second purified hydrocarbon stream is useful as aviation fuel or an aviation fuel blending component. At least a third lighter stream of components not useful as diesel or aviation fuel is also separated.

With the effluent stream of the isomerization and selective hydrocracking zone comprising both a liquid component and a gaseous component, various portions of which may be recycled, multiple separation steps may be employed. For example, hydrogen may be first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a rectification gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the deoxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the isomerization effluent after the removal of hydrogen still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization. Prior to entering the cold separator, the remainder of the isomerization and selective hydrocracking zone effluent may be combined with the hot high pressure hydrogen stripper overhead stream, and the resulting combined stream may be introduced into the cold separator.

The liquid component contains the hydrocarbons useful as diesel fuel and optionally aviation fuel, termed diesel fuel range hydrocarbons and aviation fuel range hydrocarbons, respectively, as well as smaller amounts of naphtha and LPG. The separated liquid component is further purified in a product separation zone which separates at least a lower boiling components and dissolved gases into at least an LPG and naphtha stream and a diesel range stream. A select portion of the diesel range stream is removed and recycled to the isomerization and selective cracking zone. It is the higher boiling diesel components that are selectively recycled back to the isomerization and selective cracking zone. For example, the normal C18 and higher boiling hydrocarbons could be separated and recycled, the normal C17 and higher boiling hydrocarbons could be separated and recycled, or the normal C16 and higher boiling hydrocarbons could be separated and recycled to the isomerization and selective cracking zone. Effectively, the end point of the diesel product is reduced. Selectively separating and recycling a higher boiling fraction of the diesel range hydrocarbons operates to improve the cold flow properties of the remaining fraction of the diesel range hydrocarbons in the diesel product. For example, the cloud point of the diesel product is reduced.

Those hydrocarbons recycled to the isomerization and selective cracking zone are further reacted to form smaller carbon number hydrocarbons and increased branched hydrocarbons. Both of these results aid in improving cold flow properties of the diesel product. Also, these reactions may result in an increase in the amount of hydrocarbons in the aviation range. The current process provides flexibility the portion of the diesel range hydrocarbons that are recycled can be selected so that specific results are obtained in the product diesel stream. Similarly, the quantity of the diesel range hydrocarbons that are recycled can be selected so that specific results are obtained in the product diesel stream. Finally, the portion of the diesel range hydrocarbons that are recycled can be selected so that specific results are obtained in both the product diesel stream and an optional aviation range product stream.

The selective separation of the higher boiling diesel range components for recycle may be accomplished in a variety of ways. The separation zone may contain one or more of a variety of different kinds of separation units. For example, the separation zone may contain one or more fractionation columns, separators, flash drums, and the like. Combinations of different separation devices may be employed. For example, a hot flash drum may be used to remove the bulk of the jet fuel and lighter components from the total reactor effluent. The liquid product from the flash drum could be recycled to the isomerization zone. Since this hot flash drum would provide the bulk of the recycle material, the fractionation columns used to control the final product specifications may be smaller and less costly.

In one embodiment, the product separation zone separates an LPG and naphtha overhead stream and a diesel range stream using fractionation. In this embodiment the product separation zone is a product fractionation zone. The diesel range stream may be conducted to a recycle fractionation zone which separates a selected portion of diesel range hydrocarbons for recycle to the isomerization and selective cracking zone from a product diesel stream. In another embodiment, the product fractionation zone is operated at conditions so that the bottoms stream contain the hydrocarbons for recycle while a sidecut stream contain the product diesel stream. A second optional side cut stream may contain the aviation fuel product stream. The overhead stream contains the LPG and naphtha.

In general, suitable operating conditions of the product fractionation zone include a temperature of from about 20 to about 200° C. at the overhead and a pressure from about 0 to about 1379 kPa absolute (0 to 200 psia). The conditions of the distillation zone may be adjusted to control the relative amounts of hydrocarbon contained in the aviation range product stream and the diesel range product stream. For example, the diesel product may be cut to anywhere from about 270° C. to about 295° C. endpoint and taken as a side cut and the remaining 270° C. to 290+° C. hydrocarbons taken as the bottoms stream and recycled to the isomerization and selective cracking zone. The cut point can be adjusted as needed to affect the cloud point of the diesel product. For example if the cut is adjusted to approximately 280° C., the C16+ hydrocarbons; can be separated into the bottoms stream and recycled, if the cut is adjusted to approximately 295° C., the C17 and C18 can be separated into the bottoms stream and recycled.

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used in other processes such as a feed to a hydrogen production facility. Similarly, the naphtha may be used in other processes, such as the feed to a hydrogen production facility.

In another embodiment, a single fraction column may be operated to provide four streams, with the hydrocarbons suitable for use in a diesel fuel removed from the bottom of the column, hydrocarbons suitable for use in an aviation fuel removed from a first side-cut, hydrocarbons in the naphtha range being removed in a second site-cut and the propane and light ends being removed in an overhead from the column. The bottoms stream containing the hydrocarbons useful for diesel fuel would be conducted to the recycle fractionation zone where a selected portion of the diesel range hydrocarbons would be separated and recycled to the isomerization and selective cracking zone.

In yet another embodiment, a first fractionation column may separate the hydrocarbons useful in diesel and aviation fuels into a bottoms stream, and propane, light ends, and naphtha into an overhead stream. A second fractionation column may be used to separate the hydrocarbons suitable for use in a diesel fuel into a bottoms stream of the column and hydrocarbons suitable for use in an aviation fuel into an overhead stream of the column, while a third fractionation column may be employed to separate the hydrocarbons suitable for use in a diesel fuel into a product diesel stream and a recycle diesel stream, and a fourth fractionation column may be employed to separate the naphtha range hydrocarbons from the propane and light ends. Also, dividing wall columns may be employed.

The operating conditions of the one or more fractionation columns may be used to control the amount of the hydrocarbons that are withdrawn in each of the streams as well as the composition of the hydrocarbon mixture withdrawn in each stream. Typical operating variables well known in the distillation art include column temperature, column pressure (vacuum to above atmospheric), reflux ratio, and the like. The result of changing column variables, however, is only to adjust the vapor temperature at the top of the distillation column. Therefore the distillation variables are adjusted with respect to a particular feedstock in order to achieve a temperature cut point to give a product that meets desired properties.

Optionally the process may employ a steam reforming zone in order to provide hydrogen to the hydrogenation/deoxygenation zone and isomerization zone. The steam reforming process is a well known chemical process for producing hydrogen, and is the most common method of producing hydrogen or hydrogen and carbon oxide mixtures. A hydrocarbon and steam mixture is catalytically reacted at high temperature to form hydrogen, and the carbon oxides: carbon monoxide and carbon dioxide. Since the reforming reaction is strongly endothermic, heat must be supplied to the reactant mixture, such as by heating the tubes in a furnace or reformer. A specific type of steam reforming is autothermal reforming, also called catalytic partial oxidation. This process differs from catalytic steam reforming in that the heat is supplied by the partial internal combustion of the feedstock with oxygen or air, and not supplied from an external source. In general, the amount of reforming achieved depends on the temperature of the gas leaving the catalyst; exit temperatures in the range of about 700° C. to about 950° C. are typical for conventional hydrocarbon reforming. Pressures may range up to about 4000 kPa absolute. Steam reforming catalysts are well known and conventional catalysts are suitable for use in the present invention.

Typically, natural gas is the most predominate feedstock to a steam reforming process. However, in the present invention, hydrocarbons that are too light for the desired products may be generated at any of the reaction zones. For example, in the deoxygenation zone, propane is a common by product. Other C1 to C3 paraffins may be present as well. These lighter components may be separated from the desired portion of the deoxygenation effluent and routed to the steam reforming zone for the generation of hydrogen. Similarly, paraffins having eight or less carbon atoms from the effluent of the isomerization zone may be conducted to the reforming zone. Therefore, the lighter materials from the deoxygenation, isomerization and hydrocracking zones are directed, along with stream, to a reforming zone. In the reforming zone, the lighter hydrocarbons and steam are catalytically reacted to form hydrogen and carbon oxides. The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to any of the reaction zones. Since hydrogen is an expensive resource, generating at least a portion of the required hydrogen from the undesired products of the reaction zones can decrease the cost of the process. This feature becomes more valuable when an external source of hydrogen is not readily available.

In an alternative embodiment, catalytic reforming may be employed instead of steam reforming. In a typical catalytic reforming zone, the reactions include dehydrogenation, isomerization and hydrocracking. The dehydrogenation reactions typically will be the dehydroisomerization of alkylcyclopentanes to aromatics, the dehydrogenation of paraffins to olefins, the dehydrogenation of cyclohexanes to aromatics and the dehydrocyclization of acyclic paraffins and acyclic olefins to aromatics. The isomerization reactions included isomerization of n-paraffins to isoparaffins, the hydroisomerization of olefins to isoparaffins, and the isomerization of substituted aromatics. The hydrocracking reactions include the hydrocracking of paraffins. The aromatization of the n-paraffins to aromatics is generally considered to be highly desirable because of the high octane rating of the resulting aromatic product. In this application, the hydrogen generated by the reactions is also a highly desired product, for it is recycled to at least the deoxygenation zone. The hydrogen generated is recycled to any of the reaction zones, the hydrogenation/deoxygenation zone, the isomerization zone, and or the selective hydrocracking zone.

Turning to FIG. 1, the operator determines the specifications of the product diesel to be produced. A renewable feedstock stream 2, which may pass through an optional feed surge drum, is combined with recycle gas stream 68 and recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling range and a gaseous component containing largely hydrogen, vaporous water, carbon monoxide, carbon dioxide and propane.

Deoxygenation reactor effluent stream 6 is then directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is selectively stripped from the liquid component of deoxygenation reactor effluent 6 using make-up hydrogen 10a and recycle hydrogen 28. The dissolved gaseous component comprising hydrogen, vaporous water, carbon monoxide, carbon dioxide and at least a portion of the propane, is selectively separated into hot high pressure hydrogen stripper overhead stream 14. The remaining liquid component of deoxygenation reactor effluent 6 comprising primarily normal paraffins having a carbon number from about 8 to about 24 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and or between beds 4b and 4c in order, or example, to aid in temperature control. The remainder of hot high pressure hydrogen stripper bottoms in stream 12 is combined with hydrogen stream 10b to form combined stream 18 which is routed to isomerization and selective hydrocracking reactor 22. Stream 18 may be heat exchanged with isomerization reactor effluent 24.

The product of the isomerization and selective hydrocracker reactor containing a gaseous portion of hydrogen and propane and a branched-paraffin-enriched liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44, optionally components within the boiling point range of aviation fuel is removed in stream 43, components within the boiling point range of the desired diesel fuel are removed from product stripper 42 in diesel product stream 45, with the remainder, the diesel range components having a higher boiling point range than that desired for the diesel product stream, being withdrawn from product stripper 42 in diesel recycle stream 46. Diesel recycle stream 46 is conducted to combine with stream 22 and introduced to the isomerization and selective hydrocracking zone 22. Of course, diesel recycle stream 46 may be introduced to isomerization and selective cracking zone without combining with stream 22. Stream 44 is introduced into fractionator 48 which operates to separate LPG into overhead 50 leaving a naphtha bottoms 52.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine scrubber zone 58 and into line 66. The amine may be regenerated which releases the hydrogen sulfide into line 60. Regenerated amine is then reused, and the hydrogen sulfide may be recycled to the deoxygenation reaction zone. Conditions for the first scrubber zone includes a temperature in the range of 30 to 60° C. The first absorber is operated at essentially the same pressure as the reaction zone. By "essentially" it is meant that the operating pressure of the first absorber is within about 1034 kPa absolute (150 psia) of the operating pressure of the reaction zone. For example, the pressure of the first absorber is no more than 1034 kPa absolute (150 psia) less than that of the reaction zone. The second amine absorber zone is operated in a pressure range of from 138 kPa absolute (20 psia) to 241 kPa absolute (35 psia). Also, at least the first the absorber is operated at a temperature that is at least 1° C. higher than that of the separator. Keeping the absorbers warmer than the separator operates to maintain any light hydrocarbons in the vapor phase and prevents the light hydrocarbons from condensing into the absorber solvent.

Figure 2:
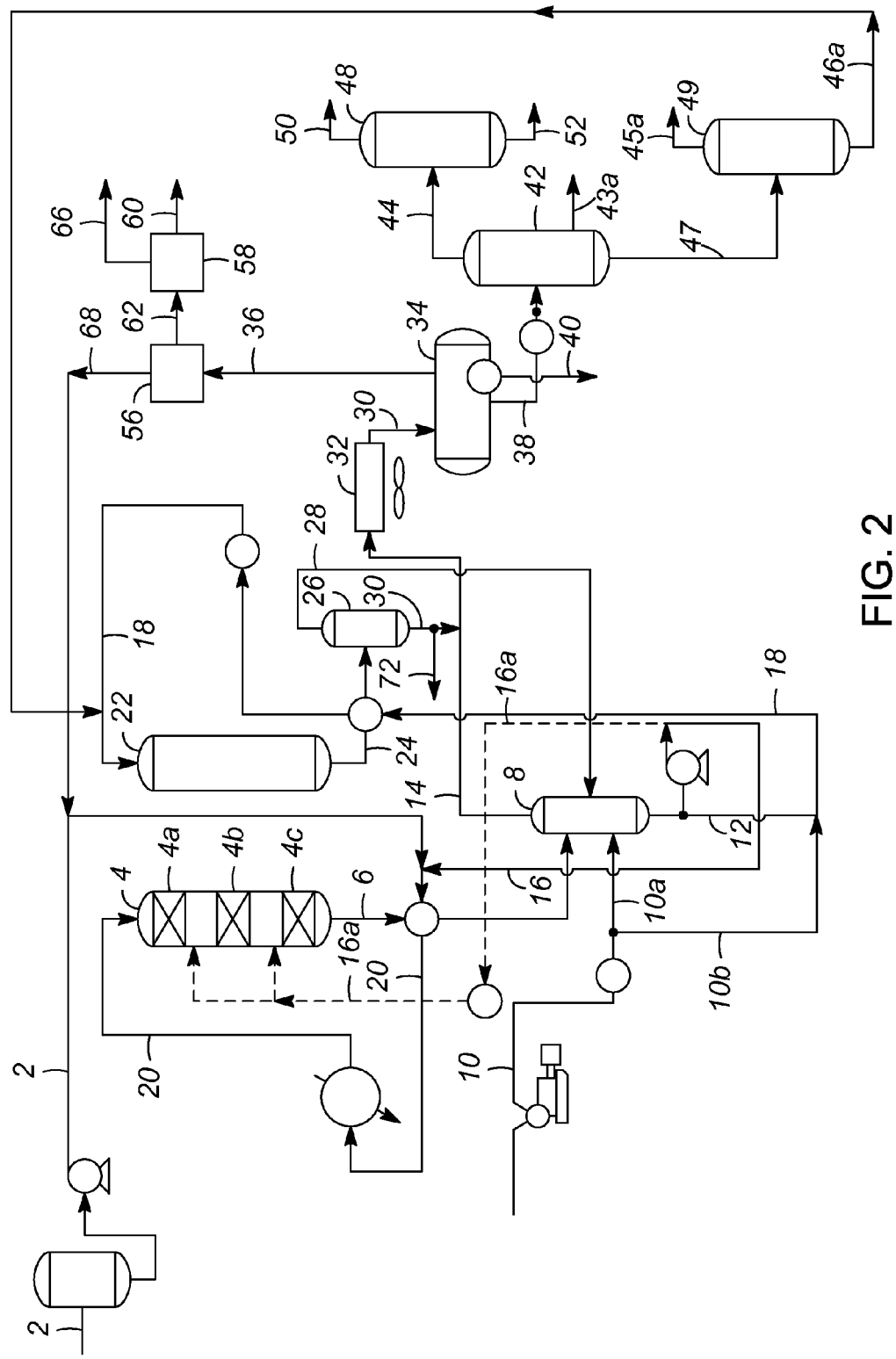
FIG. 2 is a general flow scheme of one embodiment of the invention where a recycle fractionation column is employed to generate the paraffinic recycle stream to the isomerization zone.

Turning to FIG. 2, the process is as described above up to stream 38 being introduced to product stripper 42. In this embodiment, product stripper 42 operates so that components having higher relative volatilities are separated into stream

44, optionally components within the boiling point range of aviation fuel is removed in stream 43a, and components within the boiling point range of diesel fuel are removed from product stripper 42 in diesel range stream 47. Diesel range stream 47 is conducted to diesel recycle fractionation zone 49 which operates to separate the diesel range stream into an overhead 45a comprising components within the boiling point range of the desired diesel fuel, from a diesel recycle bottoms stream 46a, comprising the diesel range components having a higher boiling point range than that desired for the diesel product stream. Diesel recycle bottoms stream 46a is conducted to combine with stream 22 and introduced to the isomerization and selective hydrocracking zone 22. Of course, diesel recycle bottoms stream 46a may be introduced to isomerization and selective cracking zone without combining with stream 22.

As discussed above, stream 44 is introduced into fractionator 48 which operates to separate LPG into overhead 50 leaving a naphtha bottoms 52. Also vapor stream 36 from product separator 34, is further processed as discussed above.

The invention claimed is:

1. A process for producing diesel boiling point range hydrocarbons from a renewable feedstock comprising:
    hydrogenating and deoxygenating the renewable feedstock by contacting the feedstock in a hydrogenation and deoxygenation zone with a hydrogenation and deoxygenation catalyst at hydrogenation and deoxygenation conditions to provide a hydrogenation and deoxygenation zone effluent comprising at least n-paraffins;
    isomerizing and selectively hydrocracking at least a portion of the n-paraffins in the hydrogenation and deoxygenation zone effluent by contacting with an isomerization and selective hydrocracking catalyst at isomerization and selective cracking conditions in an isomerization and selective hydrocracking zone to generate an isomerization and selective hydrocracking zone effluent comprising at least branched-paraffins;
    selectively separating, in a separation zone, at least a portion of the isomerization and selective hydrocracking zone effluent to provide:
        a diesel product stream comprising a first portion of the paraffins having boiling points in the diesel boiling point range
        a recycle stream comprising a second portion of the paraffins having boiling points in the diesel boiling point range wherein the composition of the diesel product stream and the recycle stream are not the same; and
        at least one overhead stream comprising at least LPG and naphtha; and
    recycling the recycle stream to the isomerization and selective hydrocracking zone.

2. The process of claim 1 wherein the separation zone comprises two or more fractionation columns.

3. The process of claim 1 wherein the separation zone comprises a single fractionation column.

4. The process of claim 1 wherein the separation zone comprises a hot flash drum and at least one fractionation column.

5. The process of claim 1 wherein the selectively separating further provides an aviation product stream comprising paraffins having boiling points in the aviation boiling point range.

6. The process of claim 1 wherein the recycle stream comprises paraffins having from 16 and greater carbon atoms.

7. The process of claim 1 wherein the recycle stream comprises paraffins having from 17 and greater carbon atoms.

8. The process of claim 1 wherein the recycle stream comprises paraffins having from 18 and greater carbon atoms.

9. The process of claim 1 wherein the renewable feedstock is in a mixture or co-feed with a petroleum hydrocarbon feedstock, and the petroleum hydrocarbon feedstock is co-processed with the renewable feedstock.

10. The process of claim 1 wherein the renewable feedstock comprises at least one component selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm oil, and kernel oil.

11. The process of claim 1 further comprising co-feeding or mixing with the renewable feedstock, a component selected from the group consisting of liquids derived from gasification of coal or natural gas followed by a downstream liquefaction; liquids derived from depolymerization, thermal or chemical, of waste plastics; and other synthetic oils generated as byproducts from petrochemical and chemical processes.

12. The process of claim 1 further comprising recycling a portion of the hydrogenation and deoxygenation zone effluent to the hydrogenation and deoxygenation zone wherein the hydrocarbon volume ratio recycle to feedstock is in the range of about 2:1 to about 8:1.

13. The process of claim 1 wherein the hydrogenation and deoxygenation zone effluent comprises a vapor phase and a liquid phase, and the process further comprises separating and removing the vapor phase from the hydrogenation and deoxygenation zone effluent before isomerizing and selectively hydrocracking.

14. The process of claim 1 further comprising mixing one or more additives to the diesel product stream.

15. A diesel fuel or diesel fuel blending component as produced by the process of claim 1.

16. A diesel fuel comprising the diesel product stream of claim 1 and a component produced from processing a petroleum feedstock.

17. The diesel fuel of claim 16 wherein the cloud point of the diesel fuel is 10° C. to −20° C. as determined by ASTM D2500.

18. An aviation fuel comprising the aviation product stream of claim 5 and a component produced from processing a petroleum feedstock.

19. The aviation fuel of claim 18 wherein the freeze point of the aviation fuel is −47° C. or lower as determined by ASTM D2500.

20. The process of claim 1 wherein the hydrogenating and deoxygenating further generates at least propane which is separated from the hydrogenation and deoxygenation zone effluent and conducted to a steam reforming zone to produce at least hydrogen, and said hydrogen being recycled to at least the hydrogenation and deoxygenation zone.

* * * * *